Figure 1:
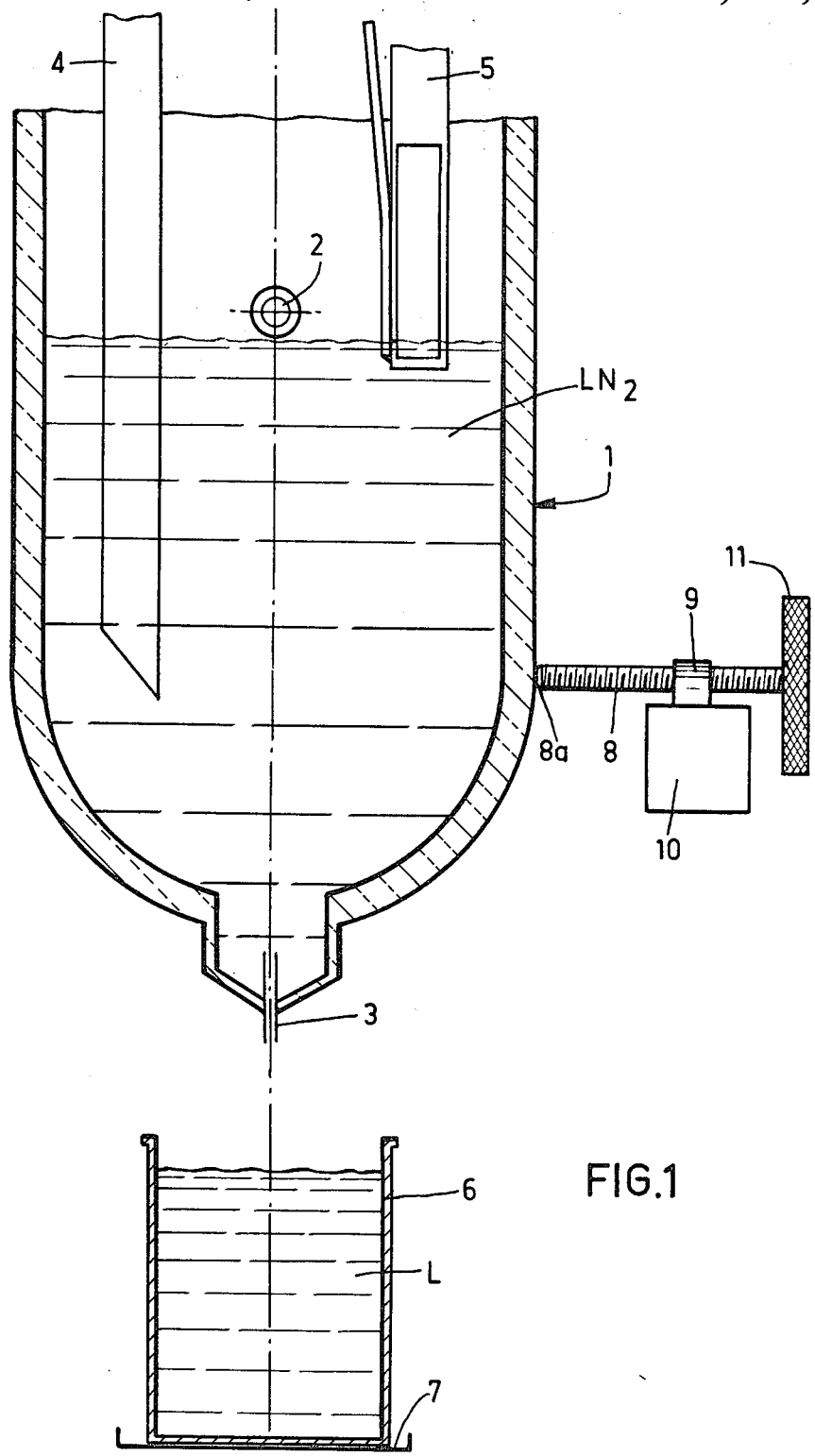

United States Patent [19]

Roullet

[11] Patent Number: 4,485,854
[45] Date of Patent: Dec. 4, 1984

[54] METHOD AND DEVICE FOR INJECTING A LIQUEFIED PRESSURIZING GAS INTO CONTAINERS

[75] Inventor: Alain Roullet, Villejuif, France

[73] Assignee: L'Air Liquide, Societe Anonyme pour l'Etude et l'Exploitation des Procedes Georges Claude, France

[21] Appl. No.: 524,392

[22] Filed: Aug. 18, 1983

[30] Foreign Application Priority Data

Sep. 13, 1982 [FR] France .................. 82 15450

[51] Int. Cl.³ .................................. B65B 31/02
[52] U.S. Cl. ............................. 141/4; 141/6; 141/266; 141/284; 141/129; 141/131; 53/432
[58] Field of Search ........................ 141/4–6, 141/1, 266, 270, 284, 129, 134, 135–137, 163, 167, 168, 170, 171, 177, 181, 392, 387–388, 131; 426/312, 316, 319, 394, 367; 53/88, 432, 510

[56] References Cited

U.S. PATENT DOCUMENTS 3,336,956  8/1967  Thorn ............................ 141/83
4,347,695  9/1982  Zobel et al. .................... 141/5 X

FOREIGN PATENT DOCUMENTS 2707004  9/1977  Fed. Rep. of Germany .
2289392  5/1976  France .
1455652  11/1976  United Kingdom ........... 141/6

Primary Examiner—Stephen Marcus
Assistant Examiner—Ernest G. Cusick
Attorney, Agent, or Firm—Young & Thompson

[57] ABSTRACT

Containers 6, adapted to receive a product which does not of itself give off a gas, receive an amount of a liquefied pressurizing gas from a tank 1 provided with an outlet nozzle 3. The containers 6 are aligned on a machine 7 which conveys them, in the direction of the alignment, under the tank 1 which is provided with trunnions 2 and is oriented in such manner as to be pivotable about an axis parallel to the direction of alignment. A control device 8 regulates the angular position of the tank 1. The amount of the liquefied pressurizing gas received in each container depends on the angular position of the tank relative to the vertical position. Thus, in the case of containers having a round section, the amount of liquefied gas received in a container is maximum when the nozzle is on the line of alignment of the containers and passes along a diameter of the container section and smaller when the tank has been pivoted away from its vertical position and the nozzle passes along a chord of the round container section. The invention is particularly applicable to the pressurizing of cylindrical cans adapted to contain non-gaseous drinks.

14 Claims, 2 Drawing Figures

METHOD AND DEVICE FOR INJECTING A LIQUEFIED PRESSURIZING GAS INTO CONTAINERS

The invention relates to the injection into containers, for example cylindrical metal cans, adapted to receive a product which does not of itself give off gas, for example a mineral water, of a liquefied pressurizing gas contained in a tank provided with a nozzle for the flow of said liquefied gas, said containers being aligned on a machine which, subsequent to the filling thereof, conveys them, in the direction of alignment, under said tank so that each thereof receives an amount of liquefied gas which is proportional to the travel effected thereby vertically under said nozzle.

Manufacturers of containers, in particular of metal cans for liquids of mass consumption such as drinks, have been induced, by considerations of cost, to employ ever decreasing thicknesses of material, in particular metal. This has resulted in a reduced strength of these containers and a danger of crushing when they are stacked on top of one another. While containers containing a product which itself gives off a gas, for example a carbonated drink, resist crushing relatively well, this is not true of containers containing a non-gaseous liquid, for example a non-gaseous drink such as mineral water, a fruit juice, etc. . . . In this case, the containers are artificially pressurized, before the closure thereof, by the introduction of a few drops of liquefied gas, usually nitrogen, which overcomes the problem of the crushing of the containers.

This pressurizing method is employed in particular in machines having a high rate of production, i.e. machines which are capable of filling 30,000 to 100,000 containers per hour and cannot be started up instantaneously, so that it is necessary, in order to ensure that the containers are pressurized in a homogeneous manner, to introduce in each one thereof an amount of liquefied gas which varies in accordance with the container feed rate of the machine.

The methods employed heretofore for varying the amount of liquefied gas introduced into containers consisted in either varying the effective section of the nozzle or adjusting the pressure head of the liquefied gas in the tank. These methods meet with serious difficulties: it is difficult to act on the section of the nozzle because of the very low temperature of the liquefied gas ($-196°$ C. for nitrogen); the variation in the pressure head of the liquefied gas has only a small effect on the rate of flow since it acts only by its square root.

An object of the present invention is to overcome the aforementioned drawbacks and to provide a method in which the position of the nozzle of the tank is varied with respect to the direction of the alignment of the containers so as to vary the amount of liquefied gas received by each container when it passes vertically under said nozzle.

In this way, it is possible to regulate the pressurizing of each container without resorting to a regulation of the effective section of the nozzle or a regulation of the pressure head of the liquefied gas in the tank, which avoids the drawbacks inherent in these methods.

According to another feature of the invention, the position of the nozzle is varied by displacing it in a direction perpendicular to the direction of alignment of the containers.

Each container is therefore pressurized to an extent which varies with the position of the nozzle of the tank. Thus, in the case of containers of cylindrical section, the liquefied gas jet may be displaced from the diameter of said container to a chord.

According to yet another feature of the invention, the tank is shifted angularly by pivoting it about a horizontal axis parallel to said direction of alignment.

Again according to the invention, the position of the nozzle, in particular the angular position of the tank, is controlled by the container feed rate of the machine.

So, a constant pressurizing of the containers can be ensured even in the course of the starting up stage.

The invention also provides, for carrying out the aforementioned method, a device for injecting liquefied gas into containers, for example cylindrical cans, adapted to receive a product which does not itself give off a gas, for example a mineral water, a liquefied pressurizing gas contained in a tank provided with a nozzle for the flow of said liquefied gas, the containers being aligned on a machine which fills them and then conveys them under said tank in the direction of alignment, wherein the nozzle of the tank is movable with respect to the direction of alignment of the containers, and means are provided for controlling the position of said nozzle.

Further features and advantages of the invention will be apparent from the following description.

Figure 2:
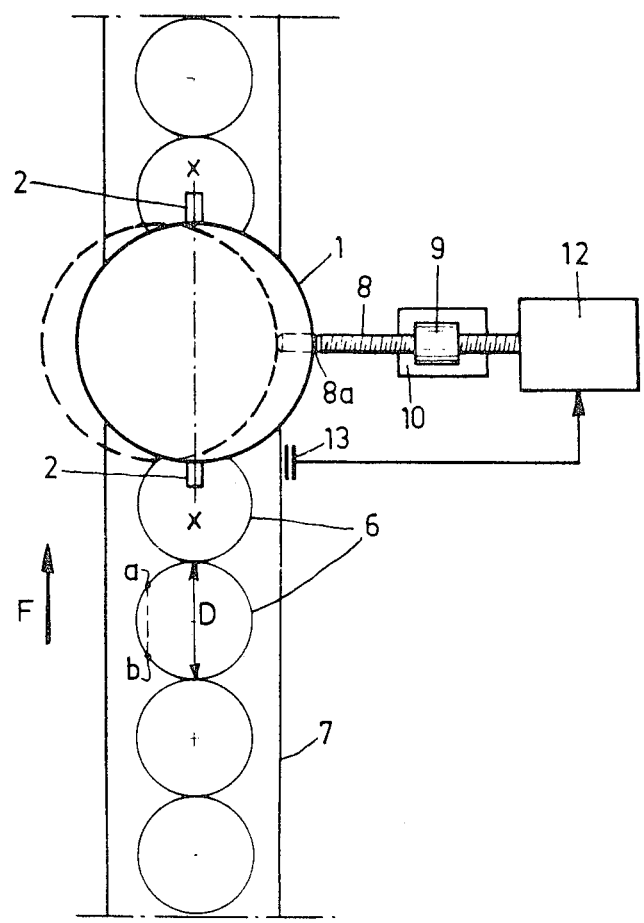

In the accompanying drawings given by way of a non-limiting example:

FIG. 1 is a diagrammatic sectional view of a device according to the invention provided with manual means for controlling the angular position of the tank, FIG. 2 is a top plan view of the device provided with automatic means for controlling the angular position of said tank.

According to the illustrated embodiment, a heat-insulated tank 1, which is open in its upper part and contains liquefied nitrogen $LN_2$, is provided, in the vicinity of said upper part, with trunnions 2 whereby it can pivot about an axis XX', and in its lower part, with a nozzle 3 for the flow of liquefied nitrogen. A supply pipe 4 and control means 5 formed by a thermocouple and a heating resistance maintain constant in the known manner the level of the nitrogen in the tank. The containers 6, constituted by metal cans of circular section, in contact with one another and containing a liquid L, are disposed in rectilinear alignment on a machine which is diagrammatically indicated at 7 and conveys them in the alignment direction F. The tank 1 is so oriented that its pivot axis XX' is parallel to the direction F, this pivoting being produced by control means constituted by a lead-screw 8 which is perpendicular to the axis XX' and has an end 8a which comes into contact with the lower part of the tank 1. This lead-screw is engaged in a fixed nut 9 mounted in a block 10 so that when it is driven in rotation, it pivots the tank 1 about its axis XX'.

In the embodiment of FIG. 1, the driving of the lead-screw is effected manually, the lead-screw being provided for this purpose with a knurled knob 11, while in the embodiment of FIG. 2, the lead-screw is driven automatically by a motor 12 controlled by a speed detector 13 in response to the container feed rate of the machine 7, so that the angular position of the tank is controlled by this feed rate. There have been shown in FIG. 2 two positions of the lead-screw 8 and two angular positions of the tank 1, one in full lines and the other in dotted lines.

With reference to FIG. 2, it can be seen that, when the tank is vertical (position shown in full lines), each container 6 effects, under the nozzle 3, a travel which corresponds to its diameter D and therefore receives an amount of liquid nitrogen proportional to this diameter, while when the tank is inclined (position shown in dotted lines), each container effects, under the nozzle 3, a travel corresponding to a chord a b, i.e. a shorter travel, so that it receives a smaller amount of liquid nitrogen. Thus it is possible to regulate the amount of liquid nitrogen received by each container by the angular position of the tank 1.

It will be understood that various types of automatic control systems may be envisaged, such as pneumatic or electric shifting devices or rams controlled by various types of speed detectors or position sensors.

These may also be provided, instead of a pivotable tank, a tank which is movable in translation, for example in a direction perpendicular to the direction F in which the containers are fed.

The scope of application of the invention covers not only containers having a cylindrical section, but also containers which may have some other section, for example an elliptical or hexagonal section, and which may be in contact or in alignment with a gap between two successive containers. The invention also permits the use of liquid nitrogen for rendering inert the gaseous atmosphere of containers, for example product preserving cans containing a solid product.

What is claimed is:

1. In a method for injecting into containers, for example cylindrical cans, for receiving a product which does not of itself give off a gas, for example a mineral water, a liquefied pressurizing gas contained in a tank having a nozzle for the flow of said liquefied gas out of the tank, comprising arranging the containers on a machine in alignment on a given line, conveying the containers, subsequent to the filling thereof, along said given line of alignment vertically under said tank so that each container receives an amount of said liquefied gas which is proportional to a travel effected thereby vertically under said nozzle; the improvement comprising varying the relative position between said line of alignment and said nozzle so as to vary the amount of liquefied gas received by each container when it passes vertically under said nozzle.

2. A method according to claim 1, wherein said relative position is varied by shifting said nozzle in a direction substantially perpendicular to said line of alignment of the containers.

3. A method according to claim 2, comprising shifting said nozzle by pivoting the tank about a substantially horizontal axis substantially parallel to said line of alignment of the containers.

4. A method according to claim 1, comprising controlling the relative position between the line of alignment and said nozzle by means responsive to the rate of conveyance of said containers of the machine.

5. A method according to claim 2, comprising controlling the relative position between the line of alignment and said nozzle by means responsive to the rate of conveyance of said containers of the machine.

6. A method according to claim 3, comprising controlling the relative position between the line of alignment and said nozzle by means responsive to the rate of conveyance of said containers of the machine.

7. In a device for injecting a liquefied pressurizing gas into containers, for example cylindrical cans, for receiving a product which does not of itself give off a gas, for example mineral water, said device comprising a tank for the gas, a nozzle on the tank for the flow of said liquefied gas out of the tank, a machine for conveying the containers, the containers being in alignment along a given line on the machine, the machine being positioned to convey the containers, subsequent to the filling of the containers, substantially along said line of alignment vertically under said tank; the improvement comprising means for moving the nozzle of the tank relative to said line of alignment of the containers, and means for controlling the position of said nozzle relative to said line of alignment.

8. A device according to claim 7, wherein the tank is movable in translation in a direction substantially perpendicular to said line of alignment.

9. A device according to claim 7, comprising trunnions combined with the tank and having a pivot axis which is substantially parallel to said line of alignment for pivoting the tank about said axis.

10. A device according to claim 7, wherein said control means comprise a fixed nut, a lead-screw engaged in the fixed nut and operatively engaged with the tank.

11. A device according to claim 8, wherein said control means comprise a fixed nut, a lead-screw engaged in the fixed nut and operatively engaged with the tank.

12. A device according to claim 9, wherein said control means comprise a fixed nut, a lead-screw engaged in the fixed nut and operatively engaged with the tank.

13. A device according to claim 10, comprising means for manually rotating the lead-screw.

14. A device according to claim 10, comprising a motor drivingly connected to the lead-screw, and means responsive to the container conveying rate of the machine and combined with the motor for controlling the motor.

* * * * *